(12) United States Patent
Chae et al.

(10) Patent No.: US 11,824,414 B2
(45) Date of Patent: Nov. 21, 2023

(54) MOTOR WINDING PATTERN AND MOTOR DRIVING SYSTEM

(71) Applicants: HYUNDAI MOTOR COMPANY, Seoul (KR); KIA CORPORATION, Seoul (KR)

(72) Inventors: Woong Chan Chae, Gwangmyeong-si (KR); Jung Shik Kim, Seoul (KR); Byung Kwan Son, Suwon-si (KR); Young Jin Shin, Changwon-si (KR); Jong Hoon Lee, Seoul (KR); Sang Hoon Moon, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 163 days.

(21) Appl. No.: 17/371,458

(22) Filed: Jul. 9, 2021

(65) Prior Publication Data

US 2022/0158514 A1 May 19, 2022

(30) Foreign Application Priority Data

Nov. 18, 2020 (KR) .................. 10-2020-0154166

(51) Int. Cl.
*H02P 7/291* (2016.01)
*H02K 3/28* (2006.01)
*H02K 3/12* (2006.01)
*H02K 3/52* (2006.01)
*H02M 1/12* (2006.01)
*H02P 27/06* (2006.01)
*H02M 7/537* (2006.01)
(Continued)

(52) U.S. Cl.
CPC ............... *H02K 3/28* (2013.01); *B60L 50/51* (2019.02); *H02K 3/12* (2013.01); *H02K 3/522* (2013.01); *H02M 1/084* (2013.01); *H02M 1/12* (2013.01); *H02M 7/537* (2013.01); *H02P 27/06* (2013.01); *B60L 2260/26* (2013.01)

(58) Field of Classification Search
CPC ...... H02K 3/12; H02K 3/522; H02K 2213/03; H02K 11/30; H02M 1/084; H02M 1/12; H02M 7/537; H02M 1/0032; H02M 1/123; H02M 7/53871; H02M 7/48; H02P 27/06; H02P 25/18; H02P 29/50
See application file for complete search history.

(56) References Cited

U.S. PATENT DOCUMENTS

2012/0319542 A1* 12/2012 Hazeyama ............. H02K 11/02
                                                                310/68 D
2017/0366115 A1* 12/2017 Akutsu ................... H02P 6/085
2019/0356260 A1* 11/2019 Severson ................ H02P 25/22

* cited by examiner

*Primary Examiner* — Muhammad S Islam
(74) *Attorney, Agent, or Firm* — MCDONNELL BOEHNEN HULBERT & BERGHOFF LLP

(57) ABSTRACT

A motor winding pattern is provided. In a driving system in which a first inverter and a second inverter are connected to a drive motor, and one end of a stator winding through which a three phase currents flow is connected to an output line of the first inverter, and the other end of the stator winding is connected to an output line of the second inverter, coils to which three phase currents are applied are wound on slots defined in a stator of the drive motor, and coils to which alternating current phases different from each other are applied are wound inside and outside each of all the slots defined in the stator on the basis of direction toward a rotation axis of the drive motor.

16 Claims, 5 Drawing Sheets

(51) Int. Cl.
 *B60L 50/51* (2019.01)
 *H02M 1/084* (2006.01)

MOTOR WINDING PATTERN AND MOTOR DRIVING SYSTEM

CROSS REFERENCE TO RELATED APPLICATIONS

The present application claims priority to Korean Patent Application No. 10-2020-0154166, filed on Nov. 18, 2020, the entire contents of which is incorporated herein for all purposes by this reference.

BACKGROUND

Field of the Disclosure

The present disclosure relates a motor winding pattern and a motor driving system, the motor winding pattern configured to be capable of cancelling harmonics of three phase currents.

Description of the Related Art

As drive motors for electric vehicles (EVs) are developed, the demand for high-performance vehicles is increasing. In order to cope with a drive motor required for such high-performance vehicles, the motor driving system needs to be developed with high torque, high output, and high speed. In general, the maximum efficiency point of the motor driving system for a high-performance motor goes along the maximum output line. Meanwhile, since the area in which the vehicle is driven (fuel economy mode) requires a low load, as the motor driving system of the high-performance motor is developed appropriately, there has been a problem that the motor driving system do not conform to the high efficiency design of the drive motor. In order to solve this problem, a two-stage driving system configured to be capable of selectively connecting two inverters to a motor is being developed.

In the motor driving system using two inverters, the two inverters are controlled to apply voltage to the motor, so that the output efficiency of the inverter and the motor can be further improved. However, when the winding pattern of the stator coil in the related art is applied to the driving system to which two inverters are applied, as a current path occurs due to the common mode (harmonic) voltage of the drive motor, there is a problem that the common mode current may be generated. In conclusion, there is a disadvantage that the generated common mode current is not canceled, thereby increasing noise, vibration, and harshness (NVH) of the drive motor and thus causing the increased loss of the drive motor.

SUMMARY

The present disclosure has been made keeping in mind the above problems occurring in the related art, and an objective of the present disclosure is to provide a motor winding pattern and a motor driving system, by which the influence of a common mode voltage on the performance of a drive motor can be reduced.

Another objective of the present disclosure provides a motor winding pattern and a motor driving system, by which the number of inverters connected to the drive motor can be controlled according to the driving mode of the vehicle and harmonics capable of being generated when two inverters are connected to the drive motor can be cancelled.

A motor winding pattern is provided according to an embodiment of the present disclosure. In a driving system in which a first inverter and a second inverter are connected to a drive motor, and one end of a stator winding through which a three phase currents flow is connected to an output line of the first inverter, and the other end of the stator winding is connected to an output line of the second inverter, coils to which three phase currents are applied are wound on slots defined in a stator of the drive motor, and coils to which alternating current phases different from each other are applied are wound inside and outside each of all the slots defined in the stator on the basis of direction toward a rotation axis of the drive motor.

According to an embodiment, two to three slots adjacent to each other may be defined as a pair of slots, and a same alternating current phase may be applied to coils wound on one side of any one pair of slots among pairs of slots adjacent to each other and coils wound on the other side of the other pair of slots.

According to an embodiment, the coils wound on one side of the slots may be defined as a basic parts, the coils wound on the other side of the slots may be defined as a short-pitch part, the short-pitch part may be short pitched by an electric angle of 60 degrees from the basic part, and harmonics generated in the short-pitch part may be cancelled each other with harmonics generated in the basic part.

According to an embodiment, a pattern in which the basic part and the short-pitch part that is short pitched by an electric angle of 60 degrees from the basic part may be arranged appears repeatedly throughout all of the slots.

According to an embodiment, 48 slots may be provided on the basis of eight poles, two slots adjacent to each other may be defined as a pair of slots, and coils to which currents of two alternating current phases are applied are wound on the pair of slots, and the coils may be wound in a short-pitch winding manner.

According to an embodiment, one pole may be provided with a first slot, a second slot, a third slot, a fourth slot, a fifth slot and a sixth slot, the coils may include a first coil disposed outside the first slot and the second slot, a second coil disposed inside the first slot and the second slot; a third coil disposed outside the third slot and the fourth slot, a short-pitch part of the first coil disposed inside the third slot and the fourth slot, a fourth coil disposed outside the fifth slot and the sixth slot, and a short-pitch part of a third coil disposed inside the fifth slot and the sixth slot, on the basis a direction toward the rotation axis of the drive motor, a same alternating current phase may be applied to the first coil and the short-pitch part of the first coil, a same alternating current phase may be applied to the third coil and the short-pitch part of the third coil, and a same alternating current phase may be applied to the second coil and the fourth coil.

According to an embodiment, the second coil may be a short-pitch part of a coil to which the same alternating current phase as that provided to an adjacent pole is applied.

According to an embodiment, a short-pitch part to which a same alternating current phase is applied with the fourth coil may be disposed at a pole adjacent to the one pole.

According to an embodiment, a gap between the coils to which currents of alternating current phases different from each other are applied may be defined at each of the slots.

According to an embodiment, 72 slots may be provided on the basis of eight poles, three adjacent slots may be defined as a set of slots, and the coils to which currents of two alternating current phases are applied are wound on the set of slots, and the coils may be wound in a short-pitch winding manner.

According to an embodiment, a same alternating current phase may be applied to coils wound on one side of any one set of slots among sets of slots adjacent to each other and coils wound on the other side of the other set of slots.

A motor driving system according to an embodiment of the present disclosure, the motor driving system includes a drive motor having a stator defining slots on which coils, to which three phase alternating currents are applied, are wound, a first inverter connected to one end of a stator winding through which three phase alternating currents flow, a second inverter connected to the other end of the stator winding through which three phase alternating currents flow, and a switch controlling connection between the other end of the stator winding and the second inverter. Coils to which alternating current phases different from each other are applied may be wounded inside and outside each of the slots on the basis of a direction toward a rotation axis of the drive motor.

According to an embodiment, the switch may control connection between the drive motor and the second inverter according to a driving mode of a vehicle.

According to an embodiment, when the driving mode of the vehicle is a high power mode, the switch may connect the drive motor and the second inverter to each other, and when the driving mode of the vehicle is a fuel economy mode, the switch may not connect the drive motor and the second inverter to each other.

According to an embodiment, a plurality of adjacent slots may be defined as a set of slots, and a same alternating current phase may be applied to coils wound on one side of any one set of slots among sets of slots adjacent to each other and coils wound on the other side of the other set of slots.

According to an embodiment, the coils wound on one side and the coils wound on the other side may be short pitched by an electrical angle of 60 degrees.

According to an embodiment of the present disclosure, the phase voltage of the AC motor is controlled by controlling the switch according to the driving mode of the vehicle, so that the circuit of the motor driving system can be changed to make it suitable for the driving mode of the vehicle. As a result, the efficiency of the AC motor can be increased in each of the high power mode and fuel economy mode.

According to an embodiment of the present disclosure, since coils are wound in a short-pitch winding manner, a winding pattern having a difference in electric angle of 60 degrees may be formed as the same alternating current phase is applied. Harmonics generated in the coil may be cancelled by each other by the winding pattern having the difference in an electric angle of 60 degrees as the same alternating current phase is applied. Accordingly, it is possible to solve problems that the NVH performance of the drive motor is worsened and the loss of the driving motor is increased.

BRIEF DESCRIPTION OF THE FIGURES

The above and other objectives, features, and other advantages of the present disclosure will be more clearly understood from the following detailed description when taken in conjunction with the accompanying drawings, in which.

DETAILED DESCRIPTION

Figure 1:
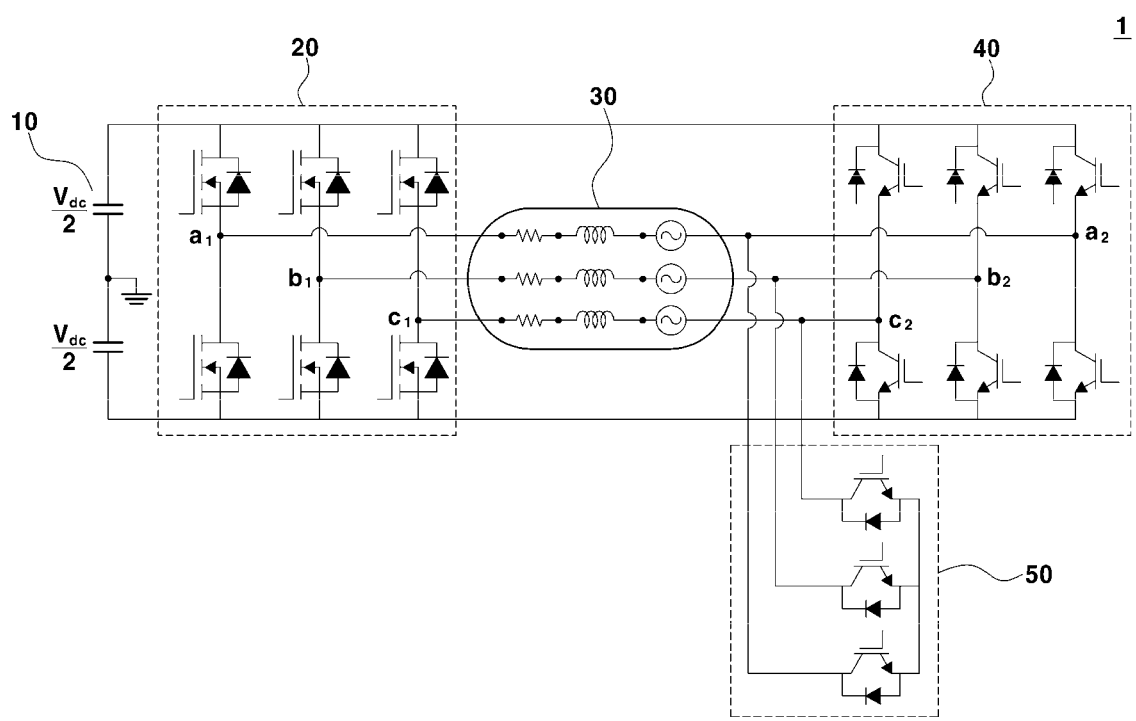
FIG. 1 is a circuit diagram showing a motor driving system according to an embodiment of the present disclosure.

Advantages and features and method of implementing the same according to the present disclosure will become apparent with reference to embodiments described later in detail together with the accompanying drawings. However, the present disclosure is not limited to the embodiments disclosed below, but may be implemented in various different forms. This embodiment is provided to complete the disclosure of the present disclosure, and to fully inform the scope of the disclosure to those of ordinary skill in the technical field to which the present disclosure belongs, and the present disclosure is defined by the scope of the claims. The same reference numerals refer to the same elements throughout the specification.

In addition, in the present specification, as names of the configurations is the same, classifying the names of the configurations into first, second, etc. is to distinguish them, and is not necessarily limited to the order in the following description. The detailed description is illustrative of the disclosure. In addition, the above description shows and describes preferred embodiments of the present disclosure, and the present disclosure can be used in various other combinations, modifications, and environments. That is, changes or modifications may be made within the scope of the concept of the disclosure disclosed in the present specification, the scope equivalent to the disclosed contents, and/or the skill or knowledge of the art. The described embodiment describes the best state for implementing the technical idea of the present disclosure, and various changes required in the specific application fields and uses of the present disclosure are also possible. Therefore, the detailed description of the disclosure is not intended to limit the disclosure to the disclosed embodiment. In addition, the appended claims should be construed as including other embodiments.

FIG. 1 is a circuit diagram showing a motor driving system according to an embodiment of the present disclosure.

Referring to FIG. 1, a motor driving system 1 may have a circuit configured to be capable of being driven in two stages according to a driving mode of a vehicle. For example, when the driving mode of the vehicle is a high power mode, the motor driving system 1 may be driven in a state in which one AC motor 30 and two inverters 20 and 40 are connected to each other (open end winding: OEW). As another example, when the driving mode of the vehicle is a fuel economy mode, the motor driving system 1 may be driven in a state in which one AC motor 30 and one inverter 20 are connected to each other (close end winding: CEW).

The motor driving system 1 may include a battery 10, a first inverter 20, an AC motor 30, a second inverter 40, and a switch 50.

The battery 10 may be an energy storage device that supplies power for driving an electric motor, in an eco-friendly vehicle, such as an electric vehicle, a plug-in hybrid vehicle, and the like, which has the AC motor 30 generating a driving force for rotating wheels. The battery 10 applied to an eco-friendly vehicle may be discharged upon driving the AC motor 30, and may be charged with power received from an external system.

The inverters 20 and 40 may be bidirectional inverters that operate selectively in such a manner as to convert DC power of the battery 10 into a plurality of alternating current powers having phases different from each other and thus output the same, or convert a plurality of alternating current powers and thus output the powers to the battery 10. That is, the AC motor 30 may be driven or regenerated by six switching elements included in each of the inverters 20 and 40.

The first inverter 20 may have a power input terminal connected to the battery 10 and first input/output terminals a1, b1, and c1 connected to the AC motor 30. When driving the AC motor 30, the first inverter 20 receives power from the battery 10 at the power input terminal, converts the same into alternating current power having a plurality of phases using the switching elements, and outputs the alternating current power to a plurality of second input/output terminals a2, b2, and c2. A technology for driving the AC motor 30 by using three-phase power having a phase difference of 120 degrees from each other is commonly applied, various embodiments of the present disclosure will be described on the basis of inverters 20 and 40 and a three-phase AC motor 30 that perform single-phase to three-phase power conversion.

The AC motor 30 may be driven when the converted three phase alternating current power is received from the inverters 20 and 40. The AC motor 30 may include a plurality of stator coils that receives a plurality of alternating current powers having different phases from the first inverter 20.

The second inverter 40 may have second input/output terminals a2, b2, and c2 connected to the AC motor 30. The second inverter 40 may control reactive power of the AC motor 30. That is, since the second inverter 40 compensates the reactive power component required by the first inverter 20, the first inverter 20 makes it possible to enlarge the constant output section according to the voltage limitation in high speed operation (high power mode of the vehicle).

The switch 50 may be connected to the second input/output terminals a2, b2, and c2 to which the second inverter 40 and the AC motor 30 are connected to each other. The switch 50 may control the connection between the AC motor 30 and the second inverter 40 according to the driving mode of the vehicle. Specifically, when the driving mode of the vehicle is a high power mode, the switch 50 may connect the AC motor 30 and the second inverter 40, and when the driving mode of the vehicle is a fuel economy mode, the switch 50 may not connect the AC motor 30 and the second inverter 40.

For example, when one AC motor 30 and two inverters 20 and 40 are connected to each other (the switch 50 is ON), a phase voltage of the AC motor 30 may be the same as the DC voltage of the battery 10. Accordingly, a state in which one AC motor 30 and two inverters 20 and 40 are connected may be suitable for a high power mode of a vehicle.

As another example, when one AC motor 30 and one inverter 20 are connected to each other (the switch 50 is OFF), a phase voltage of the AC motor 30 may be smaller than the DC voltage of the battery 10. Therefore, a state in which one AC motor 30 and one inverter 20 are connected may be more suitable for the fuel economy mode of the vehicle than the state in which one AC motor 30 and two inverters 20 and 40 are connected. According to an embodiment of the present disclosure, it is possible to control the switch 50 and thus control the phase voltage of the AC motor 30 according to the driving mode of the vehicle. Accordingly, the circuit of the driving system 1 may be changed to make it suitable for the driving mode of the vehicle. As a result, the efficiency of the AC motor 30 can be increased in each of the high power mode and the fuel economy mode.

Figure 2:
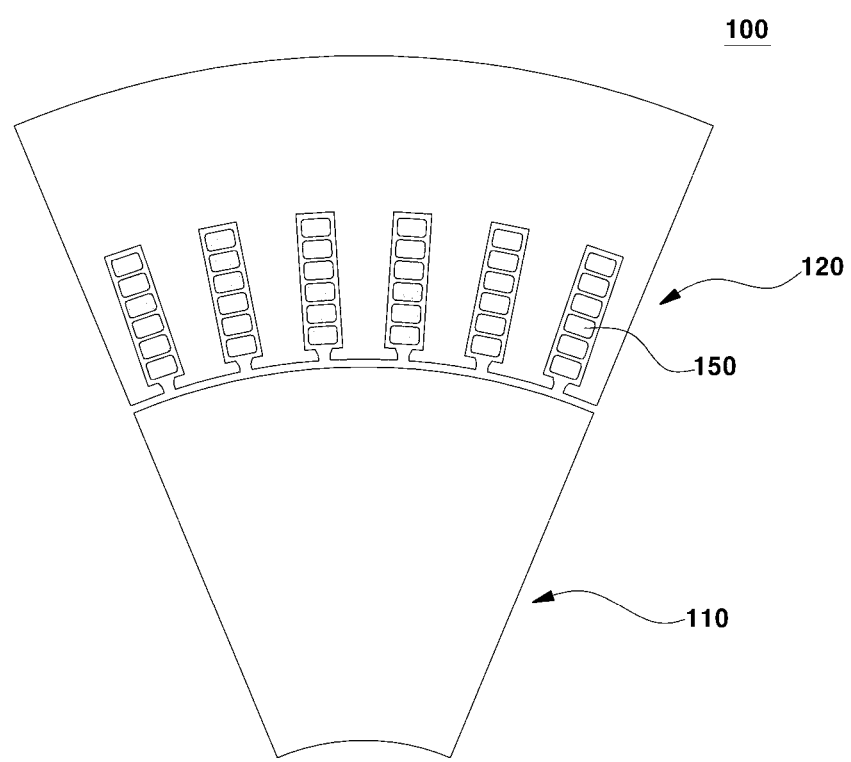
FIG. 2 is a view showing a part of a motor according to an embodiment of the present disclosure.

FIG. 2 is a view showing a part of a motor according to an embodiment of the present disclosure Referring to FIG. 2, the drive motor 100 may include a rotor 110 and a stator 120. The rotor 110 may include a plurality of permanent magnets 115. The stator 120 may be configured to have a predetermined air gap with the rotor 110. Coils to which a three-phase current is applied may be wound on the stator 120. A pattern of coils wound on a plurality of slots (not shown) defined in the stator 120 may be referred to as a winding pattern 150. The winding pattern 150 may be connected to external terminals of the drive motor 100 and thus connected to the first inverter 20 and the second inverter 40 of FIG. 1. The rotor 110 may be rotated through the current applied to the stator 120.

The winding pattern according to the exemplary embodiment of the present disclosure may be wound in a two-distribution and short-pitch winding manner. That is, a plurality of coils to which currents of alternating current phases different from each other are applied may be wound on each of the slots defined in the stator 120. A plurality of coils to which currents of the same alternating current phase are applied may be arranged to have a difference in an electric angle of 60 degrees from each other. As a result, as a plurality of coils to which currents of alternating current phases different from each other are applied are wound on each of the slots, and a plurality of coils to which currents of the same alternating current phase are applied are arranged to have a difference in an electric angle of 60 degrees from each other, harmonics capable of being generated by the winding pattern 150 may be cancelled by each other.

Figure 3:
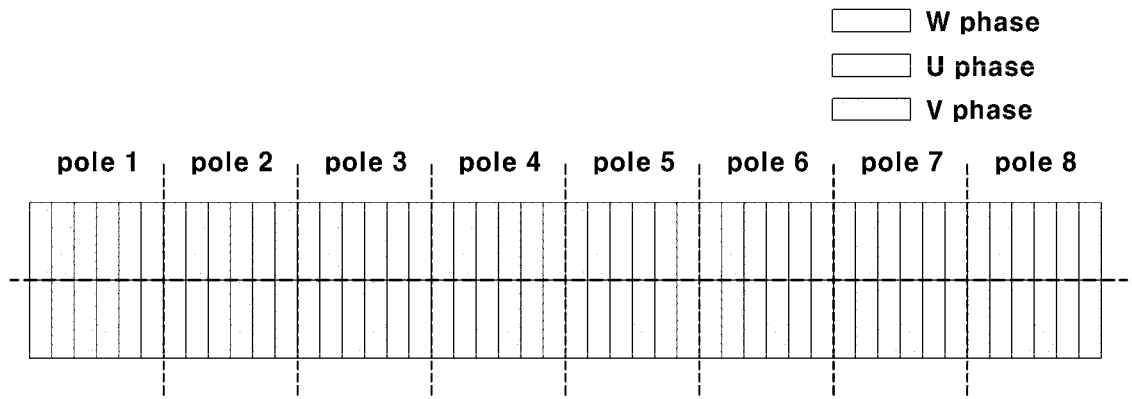
FIG. 3 is a view showing a motor winding pattern according to an embodiment of the present disclosure.

FIG. 3 is a view showing a motor winding pattern according to an embodiment of the present disclosure.

Referring to FIGS. 2 and 3, a plurality of slots (not shown) may be defined in the stator 120. For example, 48 slots may be provided on the basis of eight poles of the drive motor 100. According to an embodiment of the present disclosure, two adjacent slots are defined as a pair of slots, and coils (not shown) to which currents of two alternating current phases are applied may be wound on the pair of slots. However, the pair of slots may include three or more adjacent slots. That is, two coils (not shown) may be wound on one slot so that currents of alternating current phases different from each other are applied. Herein, the coils (not shown) may be wound in a two-distribution and short-pitch winding manner. Two-distribution means that two coils (not shown) to which the same alternating current phase is continuously applied are arranged on the basis of horizontal direction of the slots (not shown). Herein, two slots (not shown) are defined as a pair of slots, so that coils (not shown) to which currents of alternating current phases different from each other are applied are wound on each pair of slots. The winding patterns of the coils (not shown) will be described in detail in FIG. 4.

The same alternating current phase may be applied to a coil wound on one side of any one pair of slots among pairs of slots adjacent to each other and a coil wound on the other side of the other pair of slots. In the drawing, the upper part may be defined as one side of the slot, and the lower part may be defined as the other side of the slot. Coils wound on one side of the slots may be defined as a basic part, and coils wound on the other side of the slots may be defined as a short-pitch part. The basic part and the short-pitch part refer to coils to which the same alternating current phase is applied, and the short-pitch part may be electrically short-pitched by 60 degrees from the basic part.

As an example, coils to which a V-phase current is applied may be wound on one side of a slot 1 and a slot 2 of a pole 1, and coils to which a W-phase current is applied may be wound on the other side of the slot 1 and the slot 2 of the pole 1. That is, currents of alternating current phases different from each other may be applied to two coils disposed on one slot. Herein, coils to which the same V-phase current as one side of the slot 1 and the slot 2 of the pole 1 is applied may be wound on the other side of a slot 3 and a slot 4 of the pole 1. In addition, coils to which a U-phase current is applied may be wound on one side of the slot 3 and the slot 4 of the pole 1, and coils to which a U-phase current is applied may be wound on the other side of a slot 5 and a slot 6 of the pole 1. The pattern as described above may be formed equally over all eight poles of the drive motor 100.

Figure 4:
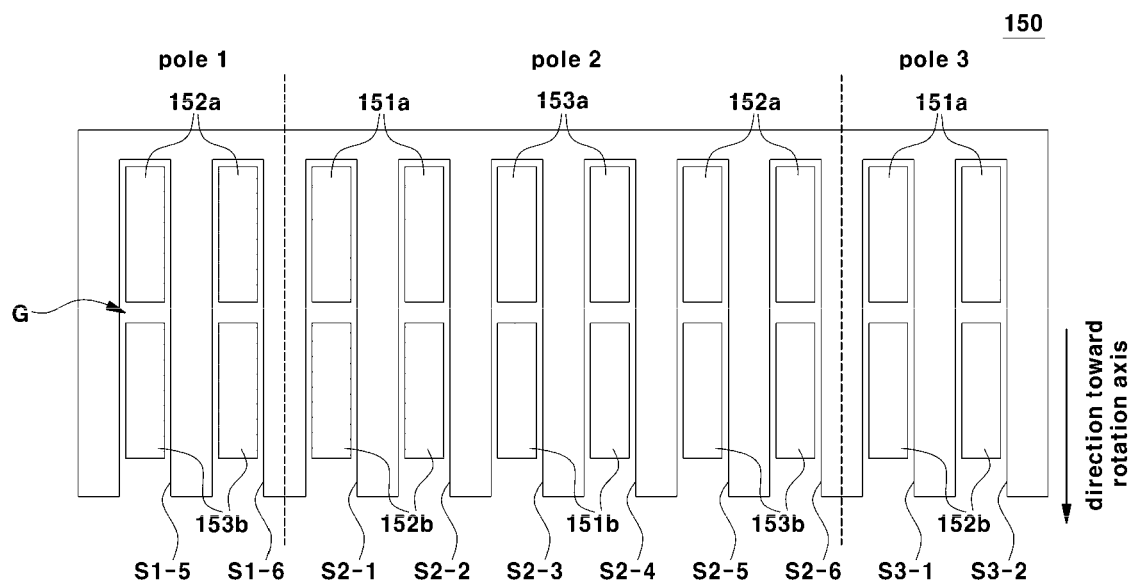
FIG. 4 is a diagram showing a winding pattern of a motor and coils wound around the motor according to an embodiment of the present disclosure.

FIG. 4 is a diagram showing a winding pattern of a motor and coils wound around the motor according to an embodiment of the present disclosure Referring FIGS. 2 to 4, six slots may be defined in one pole. In FIG. 4, there is shown based on two poles. In pole 2, a first slot S2-1, a second slot S2-2, a third slot S2-3, a fourth slot S2-4, and a fifth slot S2-5, and a sixth slot S2-6 may be provided. The coils may include a first coil 151a disposed outside the first slot S2-1 and the second slot S2-2, a second coil 152b disposed inside the first slot S2-1 and the second slot S2-2, a third coil 153a disposed outside the third slot S2-3 and the fourth slot S2-4, a short-pitch part 151b of the first coil disposed inside the third slot S2-3 and the fourth slot S2-4, a fourth coil 152a disposed outside the fifth slot S2-5 and the sixth slot S2-6, and a short-pitch part 153b of the third coil disposed inside the fifth slot S2-5 and the sixth slot S2-6, on the basis of the direction toward a rotation axis of the drive motor 100. The same alternating current phase may be applied to the first coil 151a and the short-pitch part 151b of the first coil. The same alternating current phase may be applied to the third coil 153a and the short-pitch part 153b of the third coil. In addition, the same alternating current phase may be applied to the second coil 152b and the fourth coil 152a. However, the second coil 152b may not be a short-pitch part of the fourth coil 152a. The second coil 152b may be a short-pitch part of a coil to which the same-phase alternating current provided to adjacent poles is applied. In other words, the second coil 152b may be a short-pitch part of the coil 152a wound on one side of the fifth and sixth slots of pole 1.

In addition, a short-pitch part to which same alternating current phase is applied with the fourth coil 152a may be disposed at a pole adjacent to one pole. In other words, the coil 152b wound on first and second slots of a pole 3 may be a short-pitch part of the fourth coil 152a of the pole 2.

A gap G between coils to which currents of alternating current phases different from each other are applied may be defined in each of the slots. A gap G between the first coil 151a and the second coil 152b may be defined in the first slot S2-1 and the second slot S2-2, a gap G between the third coil 153a and the short-pitch part 151b of the first coil may be defined in the third slot S2-3 and the fourth slot S2-4, and a gap G between the fourth coil 152a and the short-pitch part 153b of the third coil may be defined in the fifth and sixth slots S2-5 and S2-6.

The winding pattern of the coils may be formed equally over the entire eight poles of the drive motor 100. In other words, the coil to which any one alternating current phase is applied and the short-pitch part of the coil are not arranged in a pair of slots, and a coil to which any one alternating current phase is applied may be wound on a pair of slots, and the short-pitch part of the coil may be wound on an pair of slots adjacent thereto. Through this, an electric angle between the basic part and the short-pitch part in the coil may show a difference of 60 degrees, whereby harmonics generated in each of the basic part of the coil and the short-pitch part of the coil may be cancelled by each other.

Figure 5:
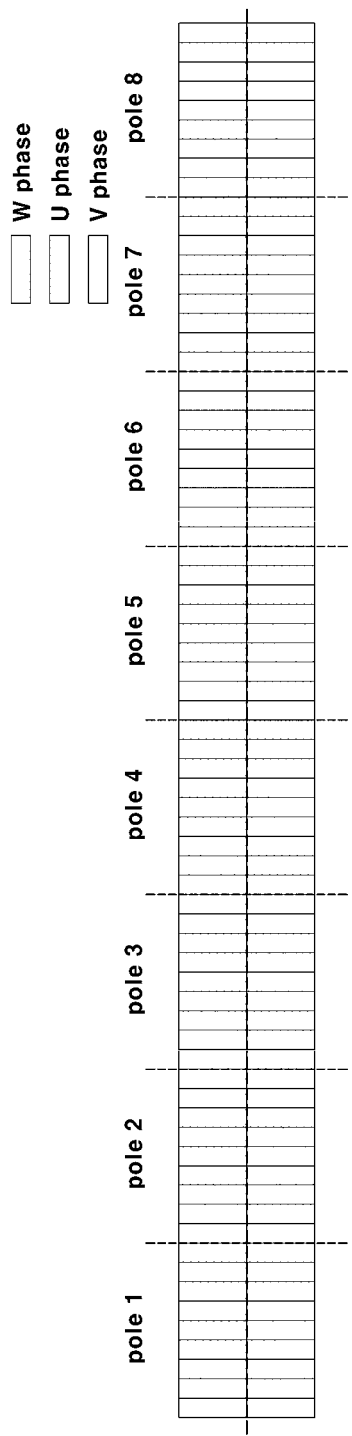
FIG. 5 is a view showing a motor winding pattern according to another embodiment of the present disclosure.

FIG. 5 is a view showing a winding pattern of a motor according to another embodiment of the present disclosure. For the sake of simplicity, overlapping descriptions will be omitted.

Referring to FIGS. 2 and 5, 72 slots may be provided based on eight poles, and coils may be wound in a three-distribution and short-pitch winding manner. Three distribution means that three coils to which the same alternating current phase is continuously applied are arranged based on horizontal direction of the slots. Herein, three slots are defined as a set of slots, so that coils to which current of alternating current phases different from each other are applied are wound on each set of slots. That is, coils to which currents of two alternating current phases are applied may be wound on a set of slots.

For example, nine slots may be provided in one pole, and coils to which current of alternating current phases different from each other are applied may be wound outside and inside of each slot. Three coils to which V-phase current is applied, three coils to which U-phase current is applied, and three coils to which W-phase current is applied may be wound on outside of the pole 1. Herein, the coils to which V-phase current is applied, the coils to which U-phase current is applied, and the coils to which W-phase current is applied may be sequentially disposed. Three coils to which W-phase current is applied, three coils to which V-phase current is applied, and three coils to which U-phase current is applied may be wound on the inside of the pole 1. Herein, the coils to which W-phase current is applied, the coils to which V-phase current is applied, and the coils to which U-phase current is applied may be sequentially disposed.

Currents of the same alternating current phase may be applied to a coil wound on one side of any one set of slots among sets of slots adjacent to each other (three consecutive and adjacent slots) and a coil wound on the other side of another set of slots. Referring to FIG. 5, the number of in-phase coils consecutive according to the number of slots is different from that of FIG. 3, and the winding pattern may be the same as that of FIG. 3. The pattern as described above may be formed equally over all eight poles of the drive motor 100.

Unlike the above example, 24 slots may be provided based on eight poles, and three slots may be provided for each pole. The coils may be wound with a single distribution and short-pitch winding manner. Even in this case, the number of consecutive in-phase coils according to the number of slots is different from that in FIG. 5, and the winding pattern may be the same as that in FIG. 5.

Figure 6:
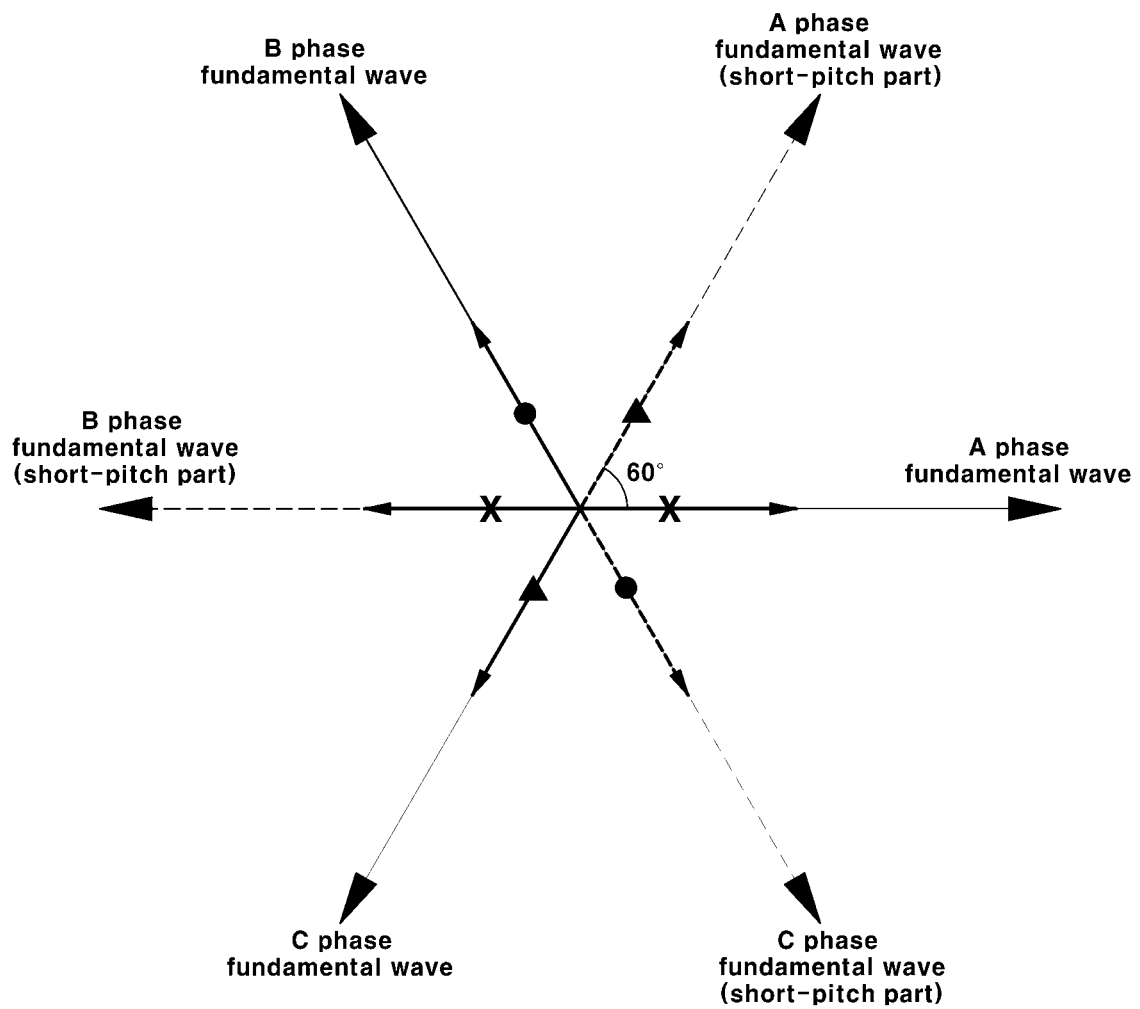
FIG. 6 is a view showing that harmonics are canceled according to an embodiment of the present disclosure.

FIG. 6 is a view showing that harmonics are canceled according to an embodiment of the present disclosure.

Referring to FIGS. 1 and 6, third harmonics may be generated in each of three phase currents. Specifically, the three phase currents may mean A-phase fundamental wave, B-phase fundamental wave, and C-phase fundamental wave, and third harmonics may be generated in each of the A-phase, B-phase, and C-phase fundamental waves.

In the motor driving system (1-stage) using only one inverter in the related art, the power of the battery 10 may be applied to the Y connection of the drive motor 30. The third harmonics generated by the three phase currents have the same magnitude and the same phase by performing control between each line in the Y connection of the drive motor 30. Therefore, the third harmonics may be cancelled by each other. However, in a motor driving system (2-stage) using two inverters according to the present disclosure, power of the battery 10 may be applied to each phase of the drive motor 30. Accordingly, although the motor driving system can be implemented with high-performance and high-efficiency design, there is a disadvantage that third harmonics generated from each of three phase currents are not canceled each other. When the third harmonics are not canceled, heat generation and efficiency decrease may occur in the drive motor 30. In addition, there may be a problem that noise, vibration, and harshness (NVH) of the drive motor are increased, when harmonics are present.

According to an embodiment of the present disclosure, a fundamental wave is generated in the basic part of the coil, and a short-pitch wave is generated in the short-pitch part of the coil. Herein, third harmonics may be generated from each of the fundamental wave and short-pitch wave. Since the fundamental wave and the short-pitch wave may have a phase difference of 60 degrees, harmonics generated from the fundamental wave and harmonics generated from the short-pitch wave may also have a phase difference of 60 degrees. According to an embodiment of the present disclosure, the harmonics generated from the fundamental wave and the harmonics generated from the short-pitch wave having a phase difference of 60 degrees can be cancelled by each other. Accordingly, it is possible to solve the problems that the NVH performance of the drive motor is worsened and the loss of the drive motor is also increased.

As described above, although embodiments of the present disclosure have been described with reference to the accompanying drawings, it will be appreciated by those of ordinary skill in the art to which the present disclosure pertains that the present disclosure can be implemented in other specific forms without changing the technical spirit or essential features. Therefore, it should be understood that the embodiments described above are illustrative and non-limiting in all respects.

The invention claimed is:

1. A motor winding pattern in a driving system, the driving system having a first inverter and a second inverter connected to a drive motor, wherein one end of a stator winding through which a three phase currents flow is connected to an output line of the first inverter, and an other end of the stator winding is connected to an output line of the second inverter;

wherein coils, to which three phase currents are applied, are wound on slots defined in a stator of the drive motor; and wherein coils to which alternating current phases different from each other are applied are wound inside and outside each of a plurality of slots defined in the stator based on a direction toward a rotation axis of the drive motor.

2. The motor winding pattern of claim 1, wherein two or three adjacent slots are defined as a pair of adjacent slots; and a same alternating current phase is applied to coils wound on one side of any one pair of slots among pairs of adjacent slots and coils wound on an other side of the other pair of slots.

3. The motor winding pattern of claim 2, wherein the coils wound on one side of the slots are defined as a basic parts, the coils wound on an other side of the slots are defined as a short-pitch part, the short-pitch part is short pitched by an electric angle of 60 degrees from the basic part, and harmonics generated in the short-pitch part cancel each other with harmonics generated in the basic part.

4. The motor winding pattern of claim 3, wherein a pattern in which the basic part and the short-pitch part that is short pitched by an electric angle of 60 degrees from the basic part are arranged appears repeatedly throughout all of the slots.

5. The motor winding pattern of claim 1, wherein 48 slots are provided based on eight poles, two slots adjacent to each other are defined as a pair of slots, and coils to which currents of two alternating current phases are applied are wound on the pair of slots, and the coils are wound in a short-pitch winding manner.

6. The motor winding pattern of claim 5, wherein one pole is provided with a first slot, a second slot, a third slot, a fourth slot, a fifth slot and a sixth slot, the coils includes:

a first coil disposed outside the first slot and the second slot;

a second coil disposed inside the first slot and the second slot;

a third coil disposed outside the third slot and the fourth slot;

a short-pitch part of the first coil disposed inside the third slot and the fourth slot;

a fourth coil disposed outside the fifth slot and the sixth slot; and a short-pitch part of a third coil disposed inside the fifth slot and the sixth slot, based a direction toward the rotation axis of the drive motor, a same alternating current phase is applied to the first coil and the short-pitch part of the first coil, a same alternating current phase is applied to the third coil and the short-pitch part of the third coil, and a same alternating current phase is applied to the second coil and the fourth coil.

7. The motor winding pattern of claim 6, wherein the second coil is a short-pitch part of a coil to which a same alternating current phase as that provided to an adjacent pole is applied.

8. The motor winding pattern of claim 6, wherein a short-pitch part to which a same alternating current phase is applied with the fourth coil is disposed at a pole adjacent to the one pole.

9. The motor winding pattern of claim 1, wherein a gap between the coils to which currents of alternating current phases different from each other are applied is defined at each of the slots.

10. The motor winding pattern of claim 1, wherein 72 slots are provided based on eight poles, three adjacent slots are defined as a set of slots, and the coils to which currents of two alternating current phases are applied are wound on the set of slots, and the coils are wound in a short-pitch winding manner.

11. The motor winding pattern of claim 10, wherein a same alternating current phase is applied to coils wound on one side of any one set of slots among sets of slots adjacent to each other and coils wound on the other side of the other set of slots.

12. A motor driving system, comprising:
a drive motor having a stator defining slots on which coils, to which three phase alternating currents are applied, are wound;
a first inverter connected to one end of a stator winding through which three phase alternating currents flow;
a second inverter connected to an other end of the stator winding through which three phase alternating currents flow; and
a switch controlling connection between the other end of the stator winding and the second inverter;
wherein coils, to which alternating current phases different from each other are applied, are wound inside and outside each of a plurality of slots based on a direction toward a rotation axis of the drive motor.

13. The motor driving system of claim 12, wherein the switch controls a connection between the drive motor and the second inverter according to a driving mode of a vehicle.

14. The motor driving system of claim 13, wherein when the driving mode of the vehicle is a high power mode, the switch connects the drive motor and the second inverter to each other, and
when the driving mode of the vehicle is a fuel economy mode, the switch does not connect the drive motor and the second inverter to each other.

15. The motor driving system of claim 12, wherein a plurality of adjacent slots is defined as a set of slots, and
a same alternating current phase is applied to coils wound on one side of any one set of slots among sets of slots adjacent to each other and coils wound on the other side of the other set of slots.

16. The motor driving system of claim 15, wherein the coils wound on one side and the coils wound on the other side are short pitched by an electrical angle of 60 degrees.

* * * * *